United States Patent
Chaudhry et al.

(10) Patent No.: US 7,565,511 B2
(45) Date of Patent: Jul. 21, 2009

(54) WORKING REGISTER FILE ENTRIES WITH INSTRUCTION BASED LIFETIME

(75) Inventors: Shailender Chaudhry, San Francisco, CA (US); Quinn A. Jacobson, Sunnyvale, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 93 days.

(21) Appl. No.: 11/425,869

(22) Filed: Jun. 22, 2006
(Under 37 CFR 1.47)

(65) Prior Publication Data

US 2007/0226467 A1   Sep. 27, 2007

Related U.S. Application Data

(60) Provisional application No. 60/781,639, filed on Mar. 13, 2006.

(51) Int. Cl.
*G06F 9/30* (2006.01)

(52) U.S. Cl. .................................................. 712/217
(58) Field of Classification Search ................. 712/218, 712/208, 214, 217
See application file for complete search history.

(56) References Cited

U.S. PATENT DOCUMENTS

| 5,142,631 | A | * | 8/1992 | Murray et al. | 712/217 |
| 5,903,740 | A | * | 5/1999 | Walker et al. | 712/217 |
| 6,092,175 | A | * | 7/2000 | Levy et al. | 712/23 |

* cited by examiner

*Primary Examiner*—David J Huisman
(74) *Attorney, Agent, or Firm*—Gunnison, McKay & Hodgson, L.L.P.; Forrest Gunnison

(57) ABSTRACT

A technique for operating a computing apparatus includes allocating a working register file entry corresponding to a register in a working register file when an instruction referencing the register proceeds through a particular stage of the computing apparatus. The technique maintains the working register file entry until at least a predetermined number of subsequent instructions have similarly proceeded through the particular stage.

25 Claims, 3 Drawing Sheets

WORKING REGISTER FILE ENTRIES WITH INSTRUCTION BASED LIFETIME

CROSS-REFERENCE TO RELATED APPLICATION(S)

This application claims the benefit of U.S. Provisional Patent Application Ser. No. 60/781,639, filed Mar. 13, 2006, the entire disclosure of which is hereby incorporated herein by reference in its entirety.

BACKGROUND

1. Field of the Invention

The present invention is generally directed to processor architecture and, more particularly, a processor architecture whose working register file entries have an instruction based lifetime.

2. Description of the Related Art

Early computer processors (also called microprocessors) included a single central processing unit (CPU) or instruction execution unit that executed only one instruction at a time. As is well known, an execution unit executes a program, having instructions stored in memory, by fetching instructions of the program, decoding the instructions and executing the instructions one after the other. In response to the need for improved performance, several techniques, e.g., pipelining, superpipelining, superscaling, speculative instruction execution and out-of-order instruction execution, have been implemented to extend the capabilities of early processors.

Pipelined architectures break the execution of instructions into a number of stages, where each stage corresponds to one step in the execution of the instruction. Pipelined designs increase the rate at which instructions can be executed by allowing a new instruction to begin execution before a previous instruction is finished executing. Pipelined architectures have been extended to superpipelined or extended pipeline architectures, where each execution pipeline is broken down into even smaller stages. In general, superpipelining increases the number of instructions that can be executed in a pipeline at any given time.

Superscalar processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. In this manner, the number of instructions that may be processed is increased due to parallel execution. Each of the two or more execution pipelines may have a different number of stages. Some of the pipelines may be optimized for specialized functions, such as integer operations or floating point operations, and in some cases execution pipelines are optimized for processing graphic, multimedia, or complex math instructions.

Typically, pipelined processors need to provide access to the registers needed for execution at multiple points in the pipeline. This can be done through separate register files, or through a content addressable memory (CAM) based register file coupled with a random access memory (RAM) based register file, or through a combination of the above and direct connections between pipeline stages, etc. In at least one architecture, the register file has included a working register file (WRF) and an architectural register file (ARF). In this design, the WRF has included working registers of the execution unit, while the ARF has included architectural registers of the execution unit. Typically, each of the working registers corresponds to one of the architectural registers. The WRF has stored generated operands for an associated pipeline, prior to validation of executed instructions. Various designs have made available operands stored within the WRF for use in executing other instructions in an associated pipeline. The ARF has been utilized, in conjunction with an associated WRF, to store generated operands of valid executed instructions. The ARF has also provided valid operands for transfer to appropriate registers of an associated WRF, in the event that one or more executed instructions are later determined to be invalid.

In a typical execution unit, each instruction has been pre-decoded to include pre-decode bits, at least some of which have been used to resolve operand dependencies with other instructions in a pipeline. The pre-decode bits have also provided a basis for the generation of control signals that are used to control the operation of the WRF, the ARF and their associated pipeline. A typical pipeline has a number of successive stages, e.g., an operand selection stage, an operand processing (i.e., execution) stage, a WRF operand write stage, an instruction validity determination stage and an ARF operand write stage, among other pipeline stages. In the usual case, each of the pipeline stages occur in one machine cycle and a lifetime of an entry in the WRF has been cycle-based. Furthermore, the WRF has traditionally been read during the operand processing or execution stage. The operand processing stage has included registers, which have latched one or more selected source operands. In a typical case, a destination operand for each instruction in the pipeline is generated by arithmetic logic in the operand processing stage for the instruction. This has been accomplished by processing one or more selected source operands in response to control signals generated by control logic of the pipeline.

That is, the control logic has decoded each instruction in the pipeline to generate control signals for controlling the arithmetic logic. The destination operand for each instruction in the pipeline has then been written to the WRF, during the WRF write stage for the instruction. In doing so, the destination operand is stored in one of the WRF working registers, which has corresponded to the architectural register that is specified by the instruction as the destination. As a result, the destination operands have been available directly from the WRF, which selectively provides source operands from selected working registers in the WRF to the pipeline during an operand selection stage for each instruction in the pipeline. This occurs if it is determined, during the operand selection stage, that the instruction specifies an architectural register in the ARF for which the source operand is available in the corresponding working register of the WRF.

For each instruction in a pipeline, it may be determined that the instruction requires an immediate source operand from the control logic, instead of a source operand from the WRF. In this case, a multiplexer selects the immediate source operand. It may also be determined, for each instruction in the pipeline, that the source operand is not yet available in a working register of the WRF, but is in-flight and available elsewhere (or may not be readily available, causing a stall for instance). In this case, the source operand may be available as a destination operand from a previous instruction. In general, the number of operand by passes required by a pipeline is drastically reduced when a WRF is implemented in conjunction with an execution unit.

Generally, in the validity determination stage for each instruction in the pipeline, it is determined whether the instruction is valid or invalid, as indicated by various status signals. In the ARF operand write stage, for each instruction in the pipeline that is determined to be valid, the architectural register in the ARF that is specified by the instruction as the destination has stored the destination operand provided by the register. In this way, the ARF has been used to store only the destination operands of instructions in the pipeline that are valid. When it is determined that an instruction in a pipeline is invalid, the valid operands stored by the architectural registers of the ARF (that correspond to the working registers of the WRF) have been transferred to the WRF. The working registers of the WRF have then stored the transferred operands to replace the operands currently stored therein. This operation has placed the WRF in the same state that it was at the time just before the invalid instruction was beginning to be executed. As a result, the transferred operands may be subsequently selected as the source operands in the pipeline. In general, execution units that use WRFs and ARFs provide a reduced number of operand bypasses. Unfortunately, as pipelines have become increasingly complex it has become increasingly difficult to read the WRF in one clock cycle. Multi-issue pipelines exacerbate this problem by requiring larger and slower multi-ported register files. Moreover, when the WRF is read at execution, increasing the read of the WRF to multiple clock cycles requires additional execution pipe stages.

What is needed is a technique for reading a register file that facilitates stage reduction in an execution pipe.

BRIEF SUMMARY

As noted above, traditionally, entries in a working register file (WRF) have been allocated when an instruction is issued to an execution pipe and survive until the instruction is retired, at which time the WRF entry is committed to the architectural register file (ARF). For an architecture having a known depth in the execution pipe, the lifetime of the WRF entry has usually been based upon a number of cycles transpiring since the referencing instruction was issued (i.e., the number of cycles related to the depth of the execution pipe).

According to one aspect of the present invention, the lifetime of a working register file (WRF) entry is instruction-based, rather than cycle-based. In one example, a WRF entry may be allocated at time of decode of an instruction referencing a register, and the referencing instruction may reside in an instruction queue for an indeterminate number of cycles before being grouped and issued to the execution pipe. The lifetime of such a WRF entry may continue until a predetermined number of subsequent instructions have been decoded (and, thus, queued for issue). The WRF entry may survive (and be available for other instructions) even if the referencing instruction has already been retired and the value of the WRF entry already committed to an architectural register file (ARF).

For example, WRF entries may be maintained in a circular queue that does not require a separate pointer to a tail of the queue. To prevent overwriting of WRF entries, the number of in-flight instructions may be limited to a predetermined maximum number, e.g., the number of in-flight instructions may be limited to thirty-two instructions. In this embodiment, decoding of a new instruction may be stalled, whenever too many instructions are already in-flight, and may resume when an in-flight instruction is retired, i.e., no longer in-flight.

Turning to another aspect of the present invention, a register file entry referenced by a decoded instruction is read before issuing the referenced instruction to an execution pipe. This facilitates implementation of an execution pipe with a reduced number of stages, as compared to prior art pipelines that have read a register file at execution. It should be appreciated that initiating a read of a register file entry before issuance to an execution pipe facilitates determination of the actual contents of the register file entry prior to execution. Depending upon when the read of the register file entry is initiated, the contents of the register file entry make be determined even when multiple cycles are required to ascertain the contents of the register file entry. This allows a designer to reduce the number of stages of an execution pipe, thus, increasing the efficiency of an associated pipeline.

These and other aspects of the described invention will be better described with reference to the Brief Description of the Drawings and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

As noted above, traditionally, entries in a working register file (WRF) have been allocated when an instruction is issued to an execution pipe and survive until the instruction is retired, at which time the WRF entry is committed to the architectural register file (ARF). For an architecture having a known depth in the execution pipe, the lifetime of the WRF entry has usually been based upon a number of cycles transpiring since the referencing instruction was issued (i.e., the number of cycles related to the depth of the execution pipe).

According to an embodiment of the present invention, a lifetime of a working register file (WRF) entry is instruction-based, rather than cycle-based. In one example, a WRF entry may be allocated at time of decode of an instruction referencing a register, and the referencing instruction may reside in an instruction queue for an indeterminate number of cycles before being grouped and issued to the execution pipe. The lifetime of such a WRF entry may continue until a predetermined number of subsequent instructions have been decoded (and, thus, queued for issue). The WRF entry may survive (and be available for other instructions) even if the referencing instruction has already been retired and the value of the WRF entry already committed to an architectural register file (ARF).

As noted above, the WRF entries may be maintained in a circular queue that does not require a separate pointer to a tail of the queue. To prevent premature overwriting of WRF entries, the number of in-flight instructions may be limited to a predetermined maximum number. Decoding of a new instruction may be stalled, whenever a maximum number of instructions are already in-flight, and may resume when an in-flight instruction is retired, i.e., no longer in-flight. For example, in-flight instructions may be limited to thirty-two instructions. As used herein the term "in-flight" refers to an instruction that has already been queued for issue to an execution pipe.

According to another aspect of the present invention, the WRF is read early, i.e., prior to issuance of an associated instruction, in order to reduce an execution pipeline length. As used herein the term "reading a register file entry" includes initiating a read, although actual contents of the register file entry may not be known: (1) for one or more cycles, or (2) until after a content addressable memory (CAM) cycle completes to identify the register holding the desired contents. As used herein the term "instruction store" may include an instruction cache, fetch buffer, etc.

Figure 1:
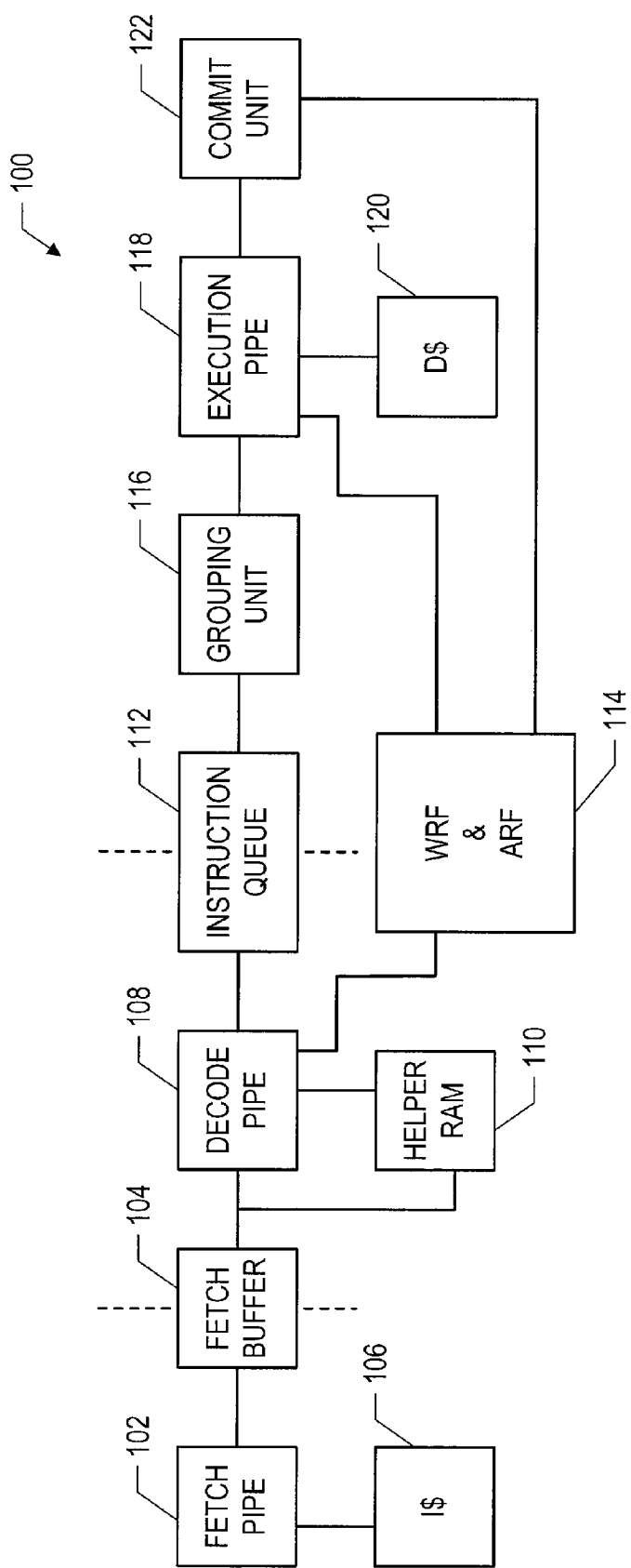
FIG. 1 depicts a relevant portion of an exemplary processor pipeline, constructed according to one embodiment of the present invention.

With reference to FIG. 1, an exemplary processor pipeline 100 is depicted that includes a fetch pipe 102, having one or more stages, that is coupled to an instruction store 106, e.g., a level 2 (L2) cache memory. It should be understood that an exemplary computing apparatus may implement multiple processor cores, e.g., 16 cores, each having multiple processor pipelines, e.g., 4 pipelines per core, on a single integrated circuit (IC) and may include multiple of such ICs. An output of the fetch pipe 102 is provided to a fetch buffer 104, which may function to decouple the fetch pipe 102 from subsequent pipes in the pipeline 100. In at least one embodiment, the fetch buffer 104 is configured to service multiple strands. As is shown in FIG. 1, a helper store 110, e.g., a programmable helper random access memory (RAM), is coupled to an output of the fetch buffer 104. The helper store 110 includes microcoded instructions that provide helper instruction sequences, when appropriate, to a decode pipe 108. In general, the helper store 110 substitutes simple instructions for a complex instruction that, for various reasons, a designer has decided not to implement directly in hardware. As is usual, the decode pipe 108 includes one or more stages that function to decode instructions. The decode pipe 108 is coupled to the instruction queue 112, which may also serve to decouple the decode pipe 108 from later stages of the pipeline 100.

As is shown, a working register file (WRF) and an architectural register file (ARF) 114 are coupled to the decode pipe 108, an execution pipe 118, and a trap and commit unit 122. It should be appreciated that while the WRF and ARF are shown combined, the WRF and ARF are usually implemented as separate files for each pipeline. Instructions stored in the instruction queue 112 may be grouped, by grouping unit 116, for execution by the execution pipe 118. The execution pipe 118 is coupled to the commit unit 122, which commits executed instructions to architectural state in the ARF. A data cache 120 is coupled to the execution pipe 118 and provides data to the execution pipe 118.

Figure 2:
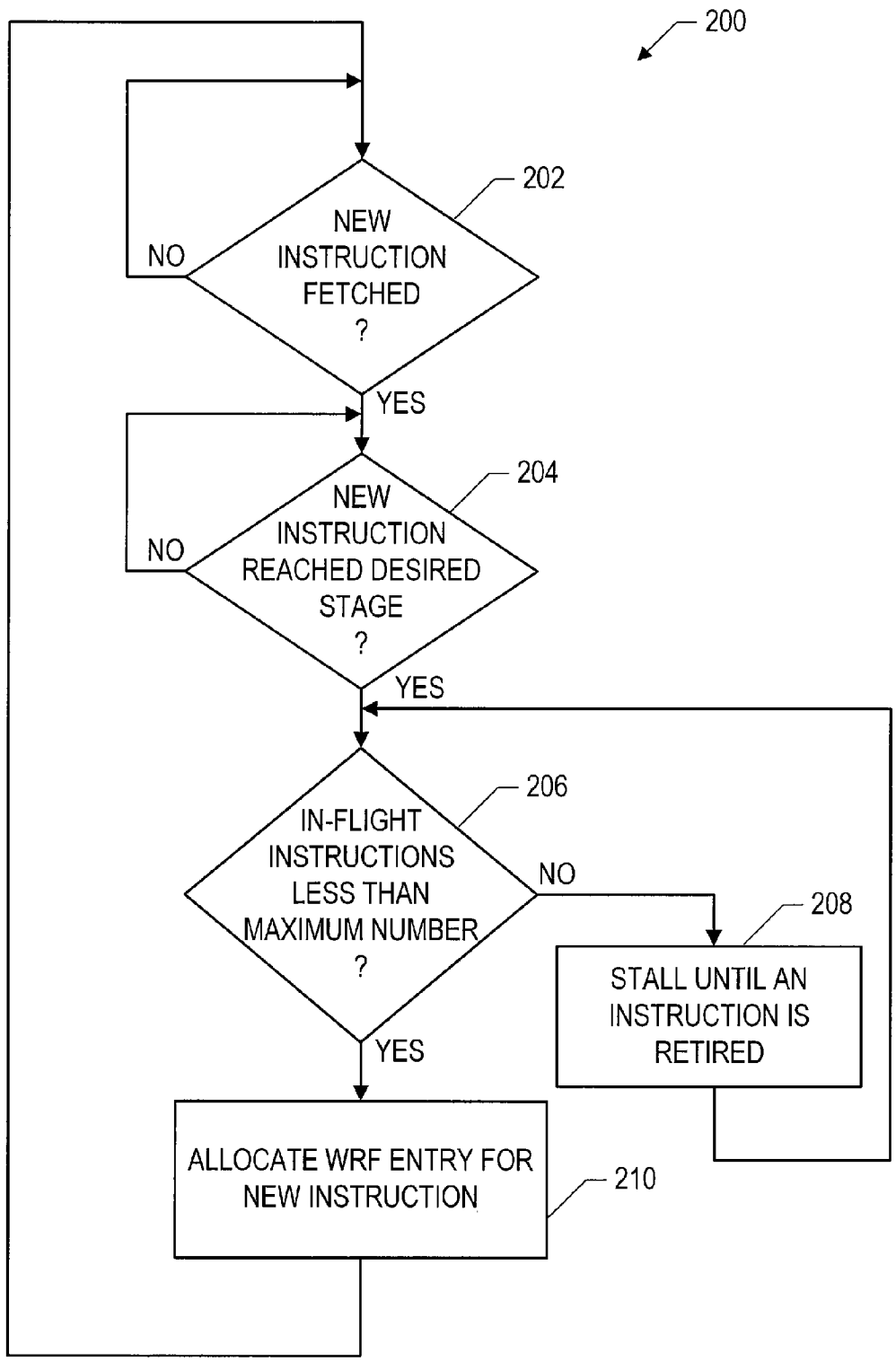
FIG. 2 depicts a flow chart for a process for allocating a working register file entry, according to one embodiment of the present invention.

With reference to FIG. 2, an exemplary process 200 is depicted for allocating a working register file entry according to various aspects of the present invention. The process 200 is initiated at decision block 202 where it is determined whether a new instruction has been fetched by, for example, the fetch pipe 102 of FIG. 1. If a new instruction has not been fetched, control loops on block 202. Assuming a new instruction has been fetched in block 202, control transfers from block 202 to decision block 204. In block 204 it is determined whether the new instruction has reached a desired stage. For example, the desired stage may be a last stage of the decode pipe 108 of FIG. 1. In the event that the new instruction that has been fetched has not reach the desired stage, control loops on block 204. Otherwise, when the new instruction has reached the desired stage in the pipeline 100 of FIG. 1, control transfers to decision block 206.

In block 206 it is determined whether the number of in-flight instructions is less than a maximum predetermined number. For example, a working register file (WRF) may be sized such that it will only hold thirty-two entries. In this case, the number of in-flight instructions is limited to thirty-two instructions to prevent a WRF entry from being overwritten before its associated instruction is retired. It should be appreciated that a WRF configured according to the present invention may include more or less than thirty-two entries. Assuming that the number of in-flight instructions is not less than the maximum number in block 206, control transfers to block 208 where decoding of the new instruction is stalled until the number of in-flight instructions are less than or equal to the predetermined maximum number, i.e., until one or more in-flight instructions are retired. From block 208 control transfers to block 206. In block 206, when the number of in-flight instructions is less than the maximum number, control transfers to block 210.

In block 210, a WRF entry is allocated for the new instruction. In conjunction with the allocation, a read of the WRF entry may be initiated. As noted above, the read of the WRF entry may require multiple cycles. When the WRF is implemented as a circular queue, a WRF entry is maintained in the queue irrespective of whether the entry has been retired to the ARF. That is, a WRF entry is not overwritten until associated space in the queue is required for a new entry. From block 210 control returns to block 202.

Thus, according to the present invention a lifetime of the WRF entry is based upon a predetermined number of instructions proceeding through a desired stage. As noted above, the desired stage may be the last stage of the decode pipe 108. Alternatively, the desired stage may reside elsewhere in the pipeline, depending upon the design of the pipeline. In any case, to reduce the stages in the execution pipe it is desirable to initiate an early read of a WRF entry such that the content of the WRF entry is available when the instruction is issued for execution to the execution pipe. Accordingly, a technique has been described herein which provides for reading a register file entry before issuing the referencing instruction to the execution pipe for execution. As noted above, this allows the number of stages in the execution pipe to be reduced due to the fact that multiple cycles are no long required in the execution pipe to read the WRF entry, as the WRF entry has been read earlier in the pipeline.

Figure 3:
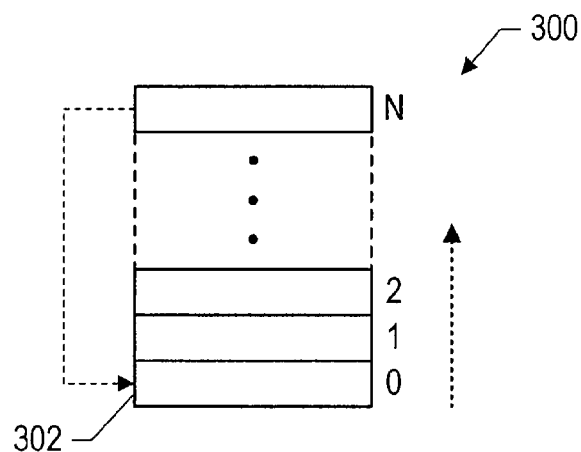
FIG. 3 depicts a circular queue for maintaining a working register file entry, according to one embodiment of the present invention.

With reference to FIG. 3, an exemplary queue 300 is depicted that includes a number of entries 302. The queue 300 is implemented as a circular queue that provides a working register file (WRF) with a predetermined number of WRF entries. As noted above, the number of entries in the queue 300 may be selected to meet the number of in-flight instructions that a designer contemplates could theoretically be achieved. The queue 300 is filled starting at entry '0' and proceeding through entry 'N', one entry at a time. After entry 'N' is filled, entry '0', which is the next entry, is overwritten upon allocation of a next WFR entry.

Figure 4:
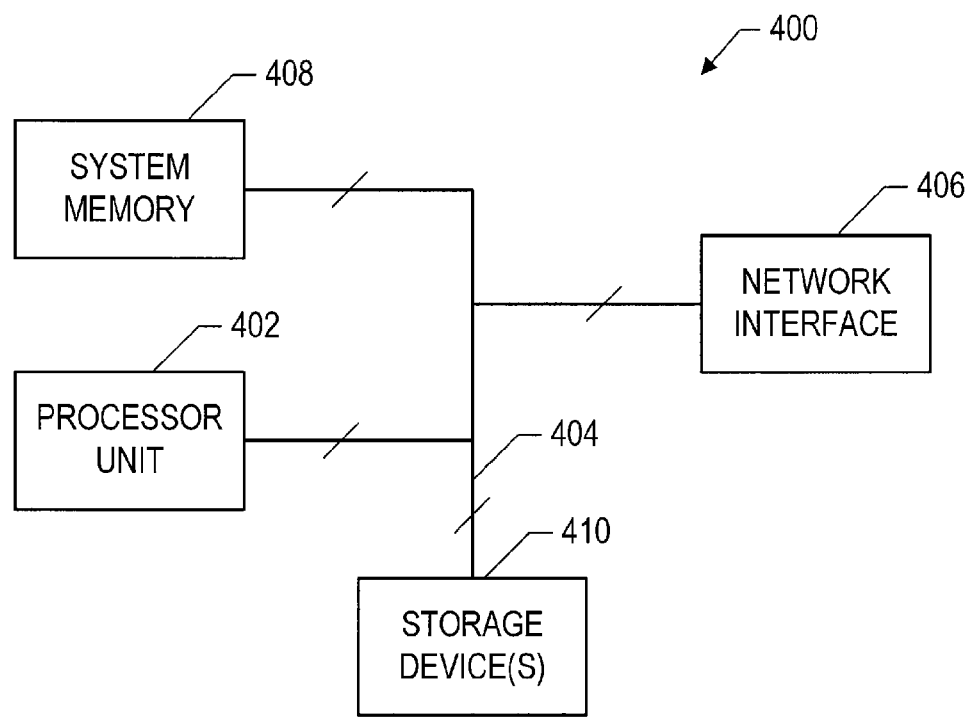
FIG. 4 is an electrical block diagram of an exemplary computer system that may be configured according to the present invention.

FIG. 4 depicts an exemplary computer system 400 constructed according to various aspects of the present invention. The computer system 400 includes a processor unit 402, which may include multiple processors, a single threaded processor, a multi-threaded processor, a multi-core processor, etc., that implements one or more of the pipelines 100. The computer system 400 also includes a system memory 408 (e.g., one or more cache levels, SRAM, DRAM, RDRAM, EDO RAM, DDR RAM, and/or EEPROM, etc.), a system bus 404 (e.g., LDT, PCI, ISA, etc.), a network interface 406 (e.g., an ATM interface, an Ethernet interface, a Frame Relay interface, etc.), and storage device(s) 410 (e.g., optical storage, magnetic storage, etc.). Computer system realizations of the invention may include fewer or additional components not illustrated in FIG. 4. For example, the system 400 may also include a video card, an audio card, additional network interfaces, peripheral devices, etc. The processor unit 402, the storage device(s) 410, the network interface 406 and the system memory 408 are coupled to the system bus 404, which includes a plurality of address, data and control lines. The processor unit 402 includes the instruction store 106 and a memory interface that couples the instruction store 106 to a memory hierarchy, i.e., the system memory 408. It should be appreciated that the computing apparatus described herein may be embodied as a design file representation encoded on one or more computer readable media.

Accordingly, a technique has been described herein that facilitates stage reduction of an execution pipe by reading a register file prior to issuance of an associated instruction.

What is claimed is:

1. A method of operating a computing apparatus, the method comprising:
    allocating a working register file entry corresponding to a register in a working register file when an instruction referencing the register proceeds through a particular stage of the computing apparatus,
        wherein upon retirement of said referencing instruction, said working register file entry is committed to an architectural register file; and
    maintaining the working register file entry for a lifetime determined by at least a predetermined number of subsequent instructions that have similarly proceeded through the particular stage so that said lifetime is instruction count based,
        wherein said predetermined number of subsequent instructions is based on a size of said working register file;
        said predetermined number of subsequent instructions is a same number of instructions for each working register file entry; and
        said working register file entry remains in said working register file until said lifetime expires, even if the referencing instruction is retired and the working register file entry is committed to said architectural register file.

2. The method of claim 1, wherein the computing apparatus comprises a multiple issue computing apparatus, and wherein the method further comprises:
    grouping the referencing instruction into a group totaling one or more instructions after allocating the working register file entry.

3. The method of claim 1, further comprising:
    permitting additional subsequent instructions to proceed through the particular stage as long as unretired instructions number no more than a predetermined maximum number wherein said predetermined maximum number is based on a size of said working register file; and
    otherwise stalling the additional subsequent instructions in the particular stage.

4. The method of claim 1, further comprising:
    limiting launching of new instructions based on the number of unretired instructions.

5. The method of claim 1, further comprising:
    launching a new instruction into flight if in-flight instructions number no more than a predetermined maximum number,
        wherein said predetermined maximum number is based on a size of said working register file; and
        an in-flight instruction is an instruction already queued for issue to an execution pipe and
        otherwise stalling decode of the new instruction until the in-flight instructions are less than or equal to the predetermined maximum number, wherein each working register file entry has a lifetime which is instruction-count based.

6. The method of claim 1, wherein the working register file entry is allocated during decoding, and wherein decoding of additional subsequent instructions is stalled when a number of in-flight instructions is greater than a predetermined maximum number,
    wherein said predetermined maximum number is based on a size of said working register file; and
    an in-flight instruction is an instruction already queued for issue to an execution pipe.

7. The method as recited in claim 1, wherein the working register file entry for the referencing instruction is extinguished after a certain number of additional subsequent instructions are launched.

8. A method of operating a computing apparatus, the method comprising:
    allocating a working register file entry corresponding to a register in a working register file during decoding, in a decode pipe, of an instruction referencing the register; and
    limiting in-flight instructions to a predetermined maximum number,
        wherein said predetermined maximum number is based on a size of said working register file;
        said working register file entry is committed to an architectural register file upon retirement of said referencing instruction following execution by an execution pipe;
        a lifetime of the working register file entry is based on said predetermined maximum number of instructions being decoded since decoding the instruction for which the working register file entry was allocated;
        said predetermined maximum number is a same number for each working register file entry; and
        said working register file entry remains in said working register file until said lifetime expires, even if the referencing instruction is retired and the working register file entry is committed to said architectural register file; and
        an in-flight instruction is an instruction already queued for issue to said execution pipe.

9. The method of claim 8, wherein decoding of subsequent instructions is stalled when said in-flight instructions are greater than the predetermined maximum number.

10. A computing apparatus comprising:
    an instruction decode pipe for decoding instructions received from an instruction store;
    a decoded instruction queue for holding decoded instructions; and
    a register file for storing at least one register file entry, wherein the register file comprises:
    an architectural register file; and
    a working register file for storing a working register file entry corresponding to a register during execution of a referencing instruction by an execution pipe, wherein the working register file entry is allocated when the instruction referencing the register is launched in-flight, wherein an in-flight instruction is an instruction already queued for issue to the execution pipe;
        upon retirement of said referencing instruction following execution by the execution pipe, said working register file entry is committed to said architectural register file;

a lifetime of the working register file entry is based on a predetermined number of instructions decoded since decoding the instruction for which the working register file entry was allocated, wherein said predetermined number of instructions is based on a size of said working register file;

said predetermined number of instructions is a same number of instructions for each working register file entry; and said working register file entry remains in said working register file until said lifetime expires, even if the referencing instruction is retired and the working register file entry is committed to said architectural register file.

11. The computing apparatus of claim 10, further comprising:

an instruction grouping block for grouping decoded instructions in the decoded instruction queue and simultaneously issuing one or more decoded instructions to the execution pipe.

12. The computing apparatus of claim 11, wherein a specific working register file entry referenced by an associated decoded instruction is read before the associated decoded referencing instruction is grouped for issuance.

13. The computing apparatus of claim 11, wherein the register file entry is read before grouping the referencing instruction for issue to the execution pipe.

14. The computing apparatus of claim 10, wherein the working register file entry is extinguished after said predetermined number of instructions have been decoded since decoding the referencing instruction for which the working register file entry was allocated.

15. The computing apparatus of claim 10, wherein the register file entry referenced by a decoded instruction is read before the referencing instruction is stored in the decoded instruction queue.

16. The computing apparatus of claim 10, wherein the working register file entry referenced by a decoded instruction is read when the referencing instruction resides in the instruction decode pipe.

17. The computing apparatus of claim 10, wherein the instruction decode pipe comprises a last stage among a plurality of stages and the working register file entry referenced by a decoded instruction is read when the referencing instruction resides in the last stage of the instruction decode pipe.

18. The computing apparatus of claim 10, wherein
after the referencing instruction is retired following execution by the execution pipe, the register file entry is read from the working register file if such entry is stored therewithin or from the architectural register file otherwise.

19. The computing apparatus of claim 10, further comprising:

replicated instruction queues.

20. The computing apparatus of claim 10, further comprising:

replicated register files.

21. The computing apparatus of claim 10 embodied as a processor integrated circuit.

22. The computing apparatus of claim 10 embodied as one or more computer readable media encoding a design file representation of the computing apparatus.

23. The computing apparatus of claim 10, further comprising:

a memory interface coupled to the instruction store; and
a memory hierarchy coupled to the memory interface.

24. The computing apparatus of claim 10, wherein the computing apparatus is an in-order execution computing apparatus.

25. The computing apparatus of claim 10, wherein the register file entry is read at time of decode of the referencing instruction.

* * * * *